US008867490B1

(12) United States Patent
Krishna et al.

(10) Patent No.: US 8,867,490 B1
(45) Date of Patent: Oct. 21, 2014

(54) SECURE AND SEAMLESS HANDOVER BETWEEN IP-BASED CELLULAR NETWORKS AND WI-FI NETWORKS (75) Inventors: Santhosh Krishna, Sunnyvale, CA (US); Andrea Goldsmith, Menlo Park, CA (US); Michael Carlton, Los Altos Hills, CA (US)

(73) Assignee: Accelera, Inc., Santa Clara, CA (US)

( * ) Notice: Subject to any disclaimer, the term of this patent is extended or adjusted under 35 U.S.C. 154(b) by 181 days.

(21) Appl. No.: 13/594,741

(22) Filed: Aug. 24, 2012

Related U.S. Application Data (60) Provisional application No. 61/527,534, filed on Aug. 25, 2011.

(51) Int. Cl.
*H04W 36/00* (2009.01)
*H04W 80/04* (2009.01)
H04L 29/06 (2006.01)
H04W 72/04 (2009.01)

(52) U.S. Cl.
CPC .......... *H04W 80/04* (2013.01); *H04W 36/0011* (2013.01); *H04L 29/06027* (2013.01); *H04W 72/04* (2013.01)
USPC ............ 370/331; 370/310; 370/352; 370/401

(58) Field of Classification Search
CPC ..................... H04W 36/0038; H04W 36/0011; H04W 36/22; H04W 72/04; H04W 80/04; H04L 29/06027; H04L 63/029
USPC ............... 370/310–401; 455/432.2, 433, 436, 455/405, 437, 461
See application file for complete search history.

(56) References Cited

U.S. PATENT DOCUMENTS

| 7,991,399 | B2 | 8/2011 | Ganesan | |
|---|---|---|---|---|
| 8,554,142 | B2* | 10/2013 | Hoover et al. | 455/41.2 |
| 8,665,819 | B2* | 3/2014 | Iyer et al. | 370/331 |
| 2005/0266848 | A1* | 12/2005 | Kim | 455/436 |
| 2006/0121916 | A1 | 6/2006 | Aborn et al. | |
| 2007/0072605 | A1* | 3/2007 | Poczo | 455/432.2 |
| 2007/0155386 | A1* | 7/2007 | Wahl et al. | 455/436 |
| 2007/0171871 | A1* | 7/2007 | Forsberg | 370/331 |
| 2007/0249291 | A1 | 10/2007 | Nanda et al. | |
| 2008/0207206 | A1* | 8/2008 | Taniuchi et al. | 455/436 |
| 2008/0214143 | A1 | 9/2008 | Heit et al. | |
| 2011/0261787 | A1* | 10/2011 | Bachmann et al. | 370/331 |
| 2013/0287006 | A1* | 10/2013 | Nix | 370/331 |

\* cited by examiner

*Primary Examiner* — Afsar M Qureshi
(74) *Attorney, Agent, or Firm* — Van Pelt, Yi & James LLP (57) ABSTRACT

A method of offloading data from an IP-based cellular network to a Wi-Fi network is disclosed. A request from a user equipment (UE) to connect to a Wi-Fi network is received. It is determined whether the UE is a subscriber to a cellular network. It is determined whether to offload data from the cellular network to the Wi-Fi network. The determination is based at least in part on a set of offload criteria. A Home IP Address is obtained, wherein the Home IP Address comprises a mobile IP address corresponding to the UE assigned by the cellular network. The Home IP Address is allocated to the UE as the UE's IP address for communicating with the UE on the Wi-Fi network. Data is offloaded from the cellular network to the Wi-Fi network.

41 Claims, 8 Drawing Sheets

SECURE AND SEAMLESS HANDOVER BETWEEN IP-BASED CELLULAR NETWORKS AND WI-FI NETWORKS

CROSS REFERENCE TO OTHER APPLICATIONS

This application claims priority to U.S. Provisional Patent Application No. 61/527,534 entitled ALGORITHM FOR SECURE AND SEAMLESS HANDOVER BETWEEN 4G AND WI-FI NETWORKS filed Aug. 25, 2011 which is incorporated herein by reference for all purposes.

BACKGROUND OF THE INVENTION

Internet Protocol based (IP-based) cellular networks, including cellular networks based on the fourth-generation (4G) Long Term Evolution (LTE) standard and on the Worldwide Interoperability for Microwave Access (WiMAX) standard, provide significantly higher data rates than previous generations of cellular networks. However, the spectrum allocated to cellular networks remains scarce, thus limiting the ability of fourth-generation and future-generation cellular networks to accommodate the growing demand for mobile data driven by mobile devices, including smartphones and the like. Therefore, improved techniques to utilize the limited cellular spectrum and to make use of non-cellular spectrum are desirable both in fourth-generation as well as future-generation cellular networks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet Protocol based (IP-based) cellular networks, including cellular networks based on the fourth-generation (4G) Long Term Evolution (LTE) standard and on the Worldwide Interoperability for Microwave Access (WiMAX) standard, provide significantly higher data rates than previous generations of cellular networks. However, the spectrum allocated to cellular networks remains scarce, thus limiting the ability of fourth-generation and future-generation cellular networks to accommodate the growing demand for mobile data driven by mobile devices, including smartphones and the like.

On the other hand, the spectrum allocated for Wi-Fi networks is significantly greater than that allocated for cellular networks. Moreover, the spectrum allocated to Wi-Fi networks is unlicensed, thus incurring no additional spectrum licensing costs to the Wi-Fi providers. Therefore, offloading mobile data from IP-based cellular networks to Wi-Fi networks may be an attractive mechanism to mitigate the spectrum scarcity faced by fourth-generation and future-generation IP-based cellular networks.

In some techniques, Wi-Fi data offloading may be initiated by a client (e.g., a connection manager) that is installed on a mobile device. For example, the client installed on a mobile device may initiate a handover from a cellular network to a Wi-Fi network after the Wi-Fi network is detected by the client. However, offloading data by a client simply switching from a cellular network to a Wi-Fi network has a number of drawbacks. For example, offloading data in this manner would cause any existing sessions established on the cellular network to be terminated before new sessions are re-established on the Wi-Fi network. Although mobile device users may not notice much interruption when they are running certain types of applications, e.g., Internet browsing, on their mobile devices, they will likely experience a significant amount of disruption when running streaming applications, conducting a voice over Internet Protocol (VoIP) call, or accessing a virtual private network (VPN). In addition, client-initiated Wi-Fi data offloading requires the client software to be constantly updated in order to support a diverse range of mobile devices that are commercially available on the market. Furthermore, quality of service (QoS) is not supported because sessions are handed off from the cellular networks to the Wi-Fi networks without considering the network conditions or loads of the two types of networks, as such network operational conditions are generally not visible to the client on a mobile device. Therefore, improved techniques for Wi-Fi data offloading are desirable.

Figure 1:
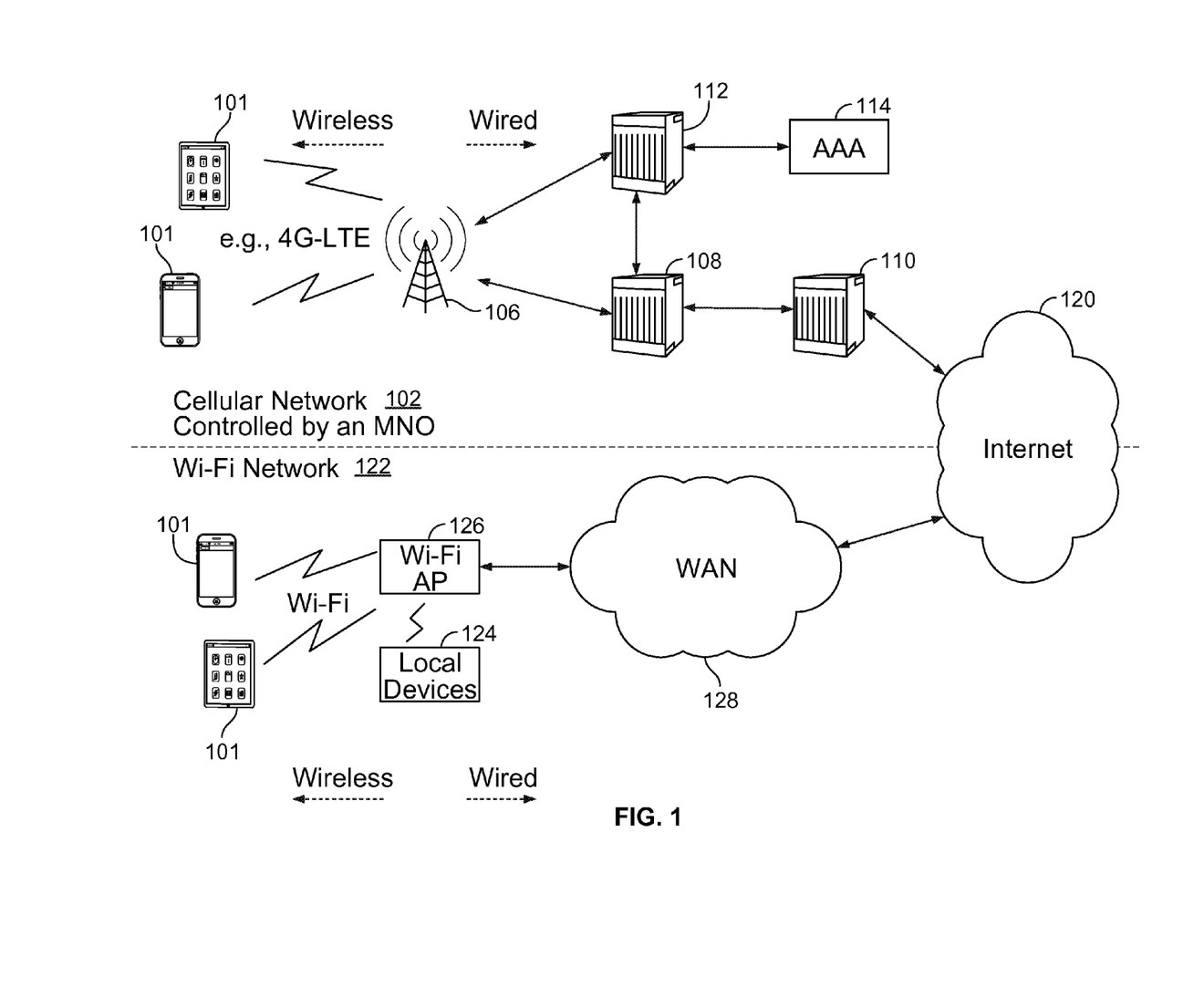
FIG. 1 is an exemplary block diagram illustrating a plurality of user equipment terminals (UEs) 101 establishing connections to the Internet (120) via either a cellular network 102 or a Wi-Fi network 122.

FIG. 1 is an exemplary block diagram illustrating a plurality of user equipment terminals (UEs) 101 establishing connections to the Internet (120) via either a cellular network 102 or a Wi-Fi network 122. An UE 101 may be any device used by an end-user to communicate, including a smartphone, a laptop computer or a tablet equipped with mobile broadband adapters, and the like.

The upper portion of FIG. 1 illustrates an embodiment of a cellular network 102 that is operated by a mobile network operator (MNO), e.g., Verizon Wireless or T-Mobile USA. An MNO is a provider of wireless communications services that owns or controls the elements to deliver services to an end-user, including radio spectrum allocation, wireless network infrastructure, back haul infrastructure, billing, customer care, and the like. Cellular network 102 provides UEs 101 with connectivity to other UEs and to different services and devices on the Internet 120.

Cellular network 102 may be any IP-based cellular network, such as a 4G LTE network, a WiMAX network, and the like. UEs 101 obtain services from cellular network 102 by communicating wirelessly with a base station 106, e.g., an eNodeB in a 4G LTE network. Base station 106 in turn communicates with other elements in cellular network 102. For example, elements in cellular network 102 include, but are not limited to, a radio-IP gateway 108, a cellular network gateway 110, a mobility management device 112, an authentication, authorization, and accounting (AAA) server 114, and a cellular network dynamic host configuration protocol (DHCP) server. AAA server 114 is a server that authenticates and authorizes a mobile user, and also provides accounting features to a billing server. A DHCP server is a server that allocates an IP address to a client. Cellular network gateway 110 is a gateway for routing and address allocation.

The lower portion of FIG. 1 illustrates an embodiment of a Wi-Fi network 122 which is connected to the Internet (120) via a wide area network (WAN) 128. A Wi-Fi network 122 may operate in a variety of settings, including a residential setting as a home Wi-Fi network, a commercial/retail setting as a Wi-Fi hotspot, or a business/office setting as an enterprise Wi-Fi network. In some embodiments, Wi-Fi network 122 is a wireless local area network (WLAN) operating in infrastructure mode. In infrastructure mode, a plurality of UEs 101 and a plurality of local devices 124 communicate with a Wi-Fi access point (Wi-Fi AP) 126 in a hub-and-spoke topology. Local devices 124 are devices that provide local services. In some embodiments, local devices 124 include local printers, copiers, scanners, cameras, storage media, fax machines, and the like.

In some embodiments, Wi-Fi AP 126 may be connected (either directly, or indirectly via a layer 2 switch or a layer 3 router) to WAN 128, which provides connectivity to the Internet (120). WAN 128 may be any backhaul connection to the Internet (120). For example, WAN 128 may include a digital subscriber line (DSL) modem, which provides Internet connectivity over the local telephone network. In another example, WAN 128 may include a cable modem, which provides Internet connectivity via a hybrid fiber-coaxial (HFC) network. In some embodiments, Wi-Fi AP 126 may be integrated with a cable modem, and the integrated unit may send traffic to a cable modem termination system (CMTS) via a hybrid fiber-coaxial (HFC) network.

Figure 2:
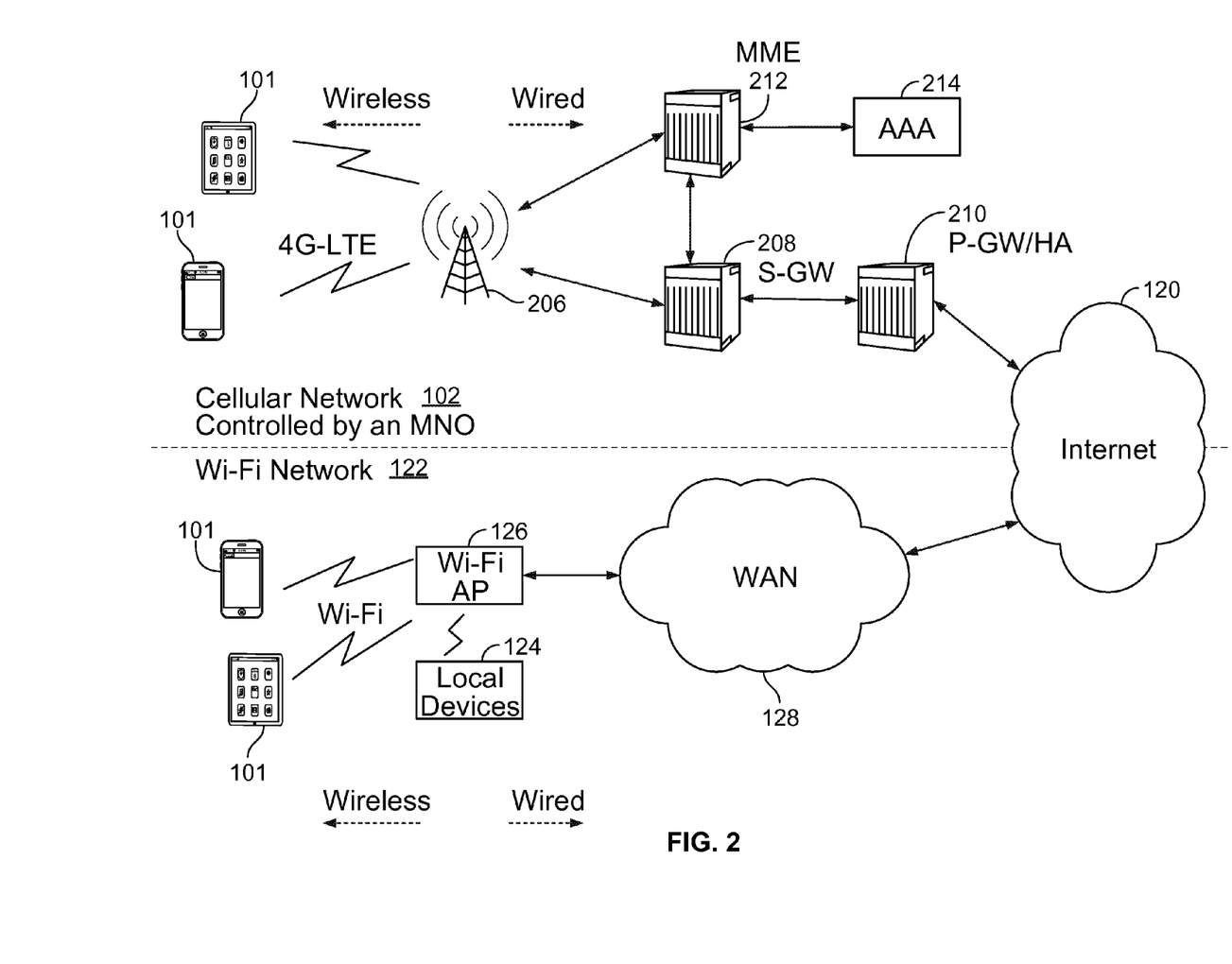
FIG. 2 is an exemplary block diagram illustrating a plurality of user equipment terminals (UEs) 101 establishing connections to the Internet (120) via either a cellular network 102 or a Wi-Fi network 122.

FIG. 2 is an exemplary block diagram illustrating a plurality of user equipment terminals (UEs) 101 establishing connections to the Internet (120) via either a cellular network 102 or a Wi-Fi network 122. FIG. 2 is similar to FIG. 1, except that cellular network 102 is shown as a generic IP-based cellular network in FIG. 1, whereas cellular network 102 is shown as a 4G LTE network in FIG. 2. For example, radio-IP gateway 108, cellular network gateway 110, and mobility management device 112 are replaced by a serving gateway (S-GW) 208, a packet gateway (P-GW) 210 or home agent 210, and a mobility management entity (MME) 212, respectively. Home agent 210 is a device that acts as an anchor point for all data communications for mobile nodes; for example, mobile nodes can move to different locations and still be able to access services through home agent 210.

Figure 3:
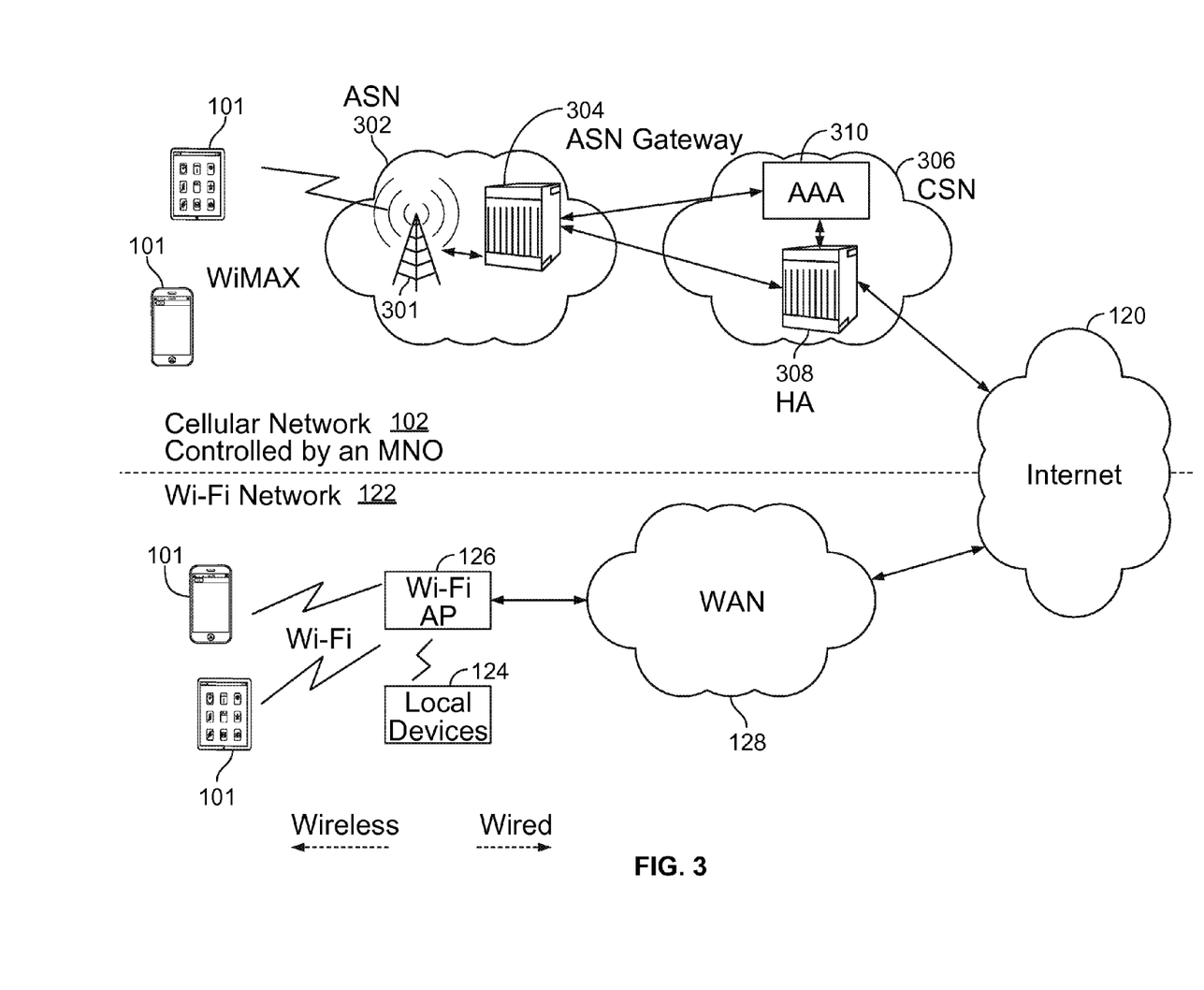
FIG. 3 is another exemplary block diagram illustrating a plurality of user equipment terminals (UEs) 101 establishing connections to the Internet (120) via either a cellular network 102 or a Wi-Fi network 122.

FIG. 3 is another exemplary block diagram illustrating a plurality of user equipment terminals (UEs) 101 establishing connections to the Internet (120), via either a cellular network 102 or a Wi-Fi network 122. In FIG. 3, cellular network 102 is shown as a WiMAX network. UEs 101 obtain services from cellular network 102 by communicating wirelessly with a base station 301 within an access service network (ASN) 302. Base station 301 in turn communicates with other elements in ASN 302, including an ASN gateway 304. ASN gateway 304 connects ASN 302 with a connectivity service network (CSN) 306, which provides connectivity to the Internet (120). Elements in CSN 306 include, but are not limited to, a home agent 308 and an AAA server 310.

Note that the techniques disclosed in the present application are applicable to any IP-based cellular network standard, including the 4G LTE network as shown in FIG. 2 and the WiMAX network as shown in FIG. 3. Therefore, even though the techniques may be disclosed using terminologies corresponding to a particular type of network/standard, the techniques disclosed in the present application should not be limited to one type of network/standard only.

Figure 4:
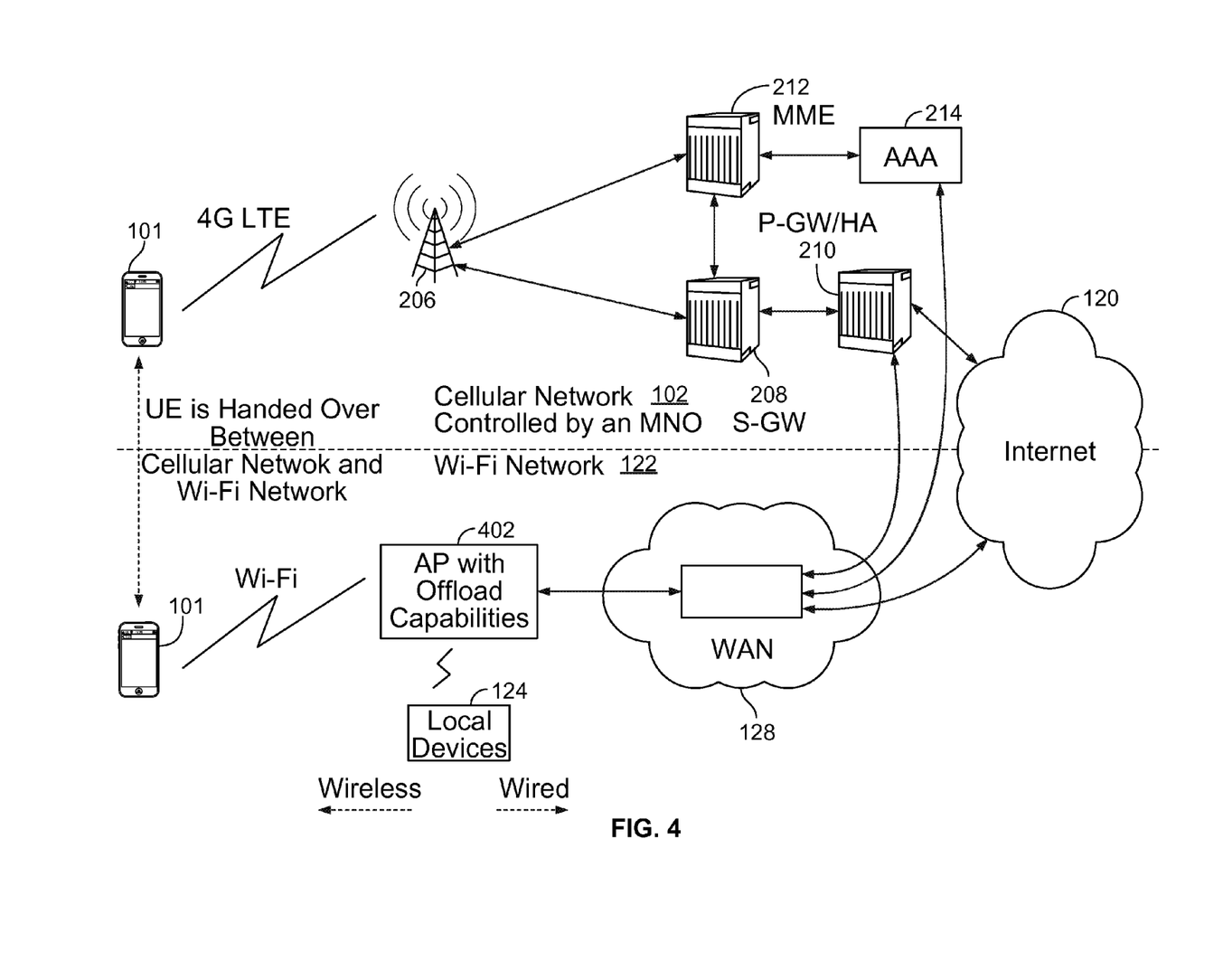
FIG. 4 is a block diagram illustrating an embodiment of a system for seamless handover and data offloading between a cellular network and a Wi-Fi network.

FIG. 4 is a block diagram illustrating an embodiment of a system for seamless handover and data offloading between a cellular network and a Wi-Fi network. As shown in FIG. 4, a UE 101 can be handed over between cellular network 102 and Wi-Fi network 122. The handover and data offloading is controlled by an AP 402 with offloading capabilities. The criteria for handover and data offloading are determined by AP 402. In some embodiments, no special client software is required on UE 101 for the handover and data offloading disclosed in the present application to work, because no action or coordination with the UE is required. As will be described in greater detail below, existing sessions established on cellular network 102 may be preserved during data offloading by using mobile IP tunneling, thus avoiding interruptions to any applications, e.g., streaming video, VoIP call, and VPN access, that are already running on UE 101. In addition, as will be described in greater detail below, AP 402 enables UE 101 to access any local services provided by local devices 124 on the Wi-Fi network.

Figure 5:
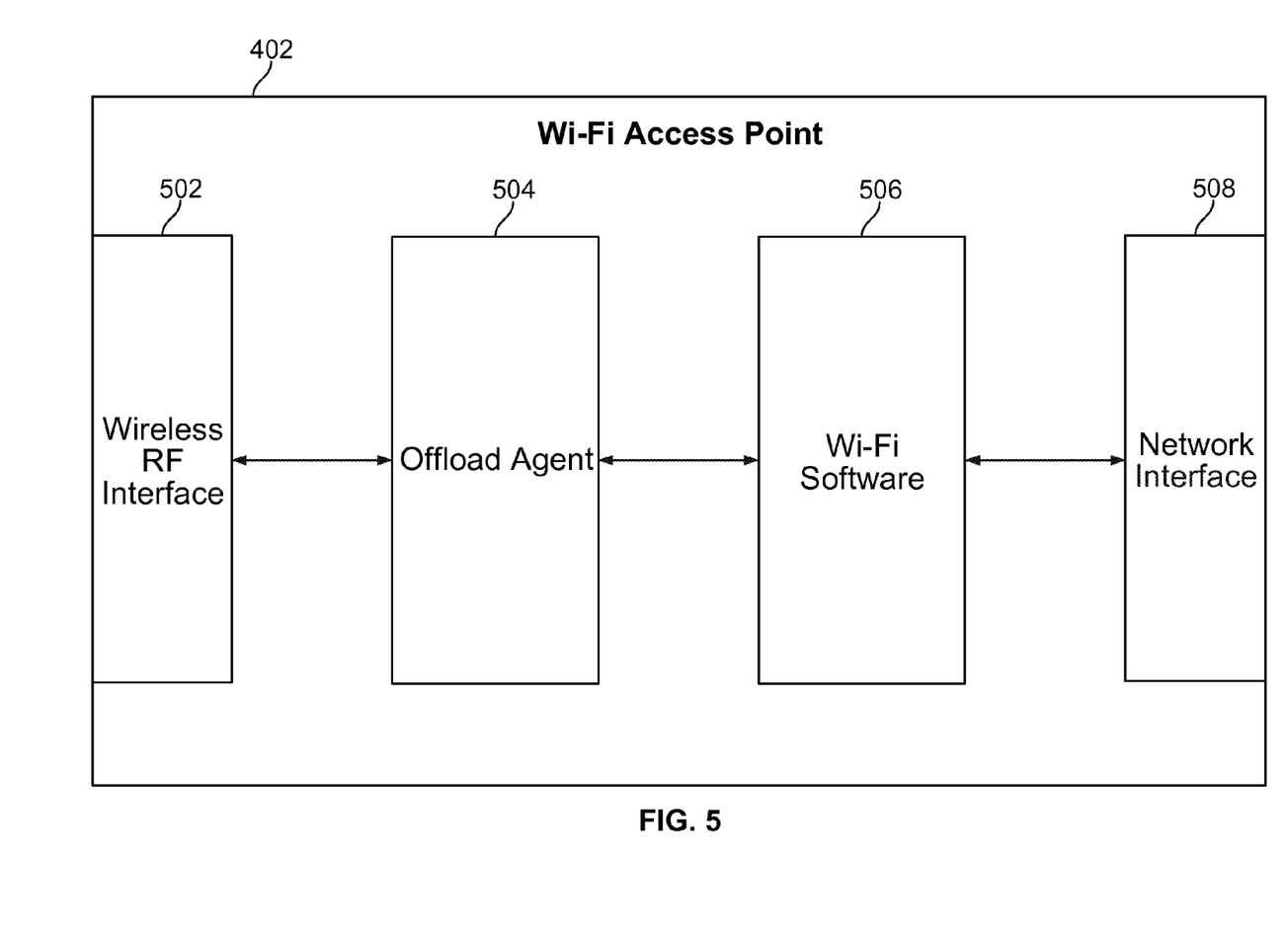
FIG. 5 is a block diagram illustrating an embodiment of a Wi-Fi access point for seamless handover and data offloading between a cellular network and a Wi-Fi network.

FIG. 5 is a block diagram illustrating an embodiment of a Wi-Fi access point for seamless handover and data offloading between a cellular network and a Wi-Fi network. In some embodiments, the Wi-Fi access point in FIG. 5 is AP 402 as shown in FIG. 4. Seamless handover and data offloading are controlled by an offload agent 504. For example, as shown in FIG. 5, offload agent 504 may be implemented as a middleware between a wireless RF interface 502 and a Wi-Fi protocol software 506. Offload agent 504 performs processing on both the control path and the data path.

AP 402 determines when and whether to handoff and offload data between cellular networks and Wi-Fi networks. A handoff from the cellular network to the Wi-Fi network or from the Wi-Fi network to the cellular network may be based on a set of criteria. The set of criteria may be based on any combination of network policies and characteristics, QoS requirements of the UE (such as whether the UE is a subscriber with premium services or standard services), the type of application (e.g., video versus HTTP traffic), network performance, load-balancing metrics, and the like. Network policies may include the policy of the mobile network operator (MNO), the policy of the Wi-Fi network backhaul provider (e.g., the DSL service provider or the cable network service provider), and/or the policy of the local network (e.g., the network access policy of an enterprise). Performance and load-balancing metrics may include the level of traffic congestion, the degree of latency, the throughput, or other metrics. The metrics may be monitored on the cellular network and the Wi-Fi network.

Criteria for handoff from a cellular network to a Wi-Fi network may include, but are not limited to, one or more of the following:
- All data sessions are handed off from the cellular network to the Wi-Fi network, whereas all voice sessions are maintained on the cellular network;
- All cellular traffic is handed off to the Wi-Fi network whenever the Wi-Fi network is detected;
- All cellular traffic is handed off to the Wi-Fi network when the quality of the cellular link falls below a given performance target;
- All high-priority data or data requiring a given QoS remain on the cellular network, and all other data are handed off to the Wi-Fi network;
- The quality of a UE's cellular and Wi-Fi connections are monitored, and handoff from the cellular network to the Wi-Fi network occurs if the Wi-Fi network delivers better performance.

Criteria for handoff from a Wi-Fi network to a cellular network may include, but are not limited to, one or more of the following:
- All voice sessions (e.g., Skype VoIP sessions) are handed off from the Wi-Fi network to the cellular network, whereas all data sessions are maintained on the Wi-Fi network.
- All Wi-Fi traffic or Wi-Fi traffic requiring a given QoS are handed off to the cellular network when the quality of the Wi-Fi link falls below a given performance target.
- All high-priority data or data requiring a given QoS are handed off to the cellular network, and all other data remain on the Wi-Fi network
- The quality of a UE's cellular and Wi-Fi connections are monitored, and handoff from the Wi-Fi network to the cellular network occurs if the cellular network delivers better performance.

Some UEs 101 may be pre-programmed with a given network preference (e.g., pre-programmed to always use a Wi-Fi network when available). Under this situation, if the handoff criteria determine that the UE should use the cellular network for access, AP 402 may block or deny any Wi-Fi network access by the UE 101 to force the handoff from the Wi-Fi network to the cellular network. Alternatively, UEs 101 may be enabled to set the network it connects to based on a control command, in which case the control command would be issued by AP 402.

Figure 6:
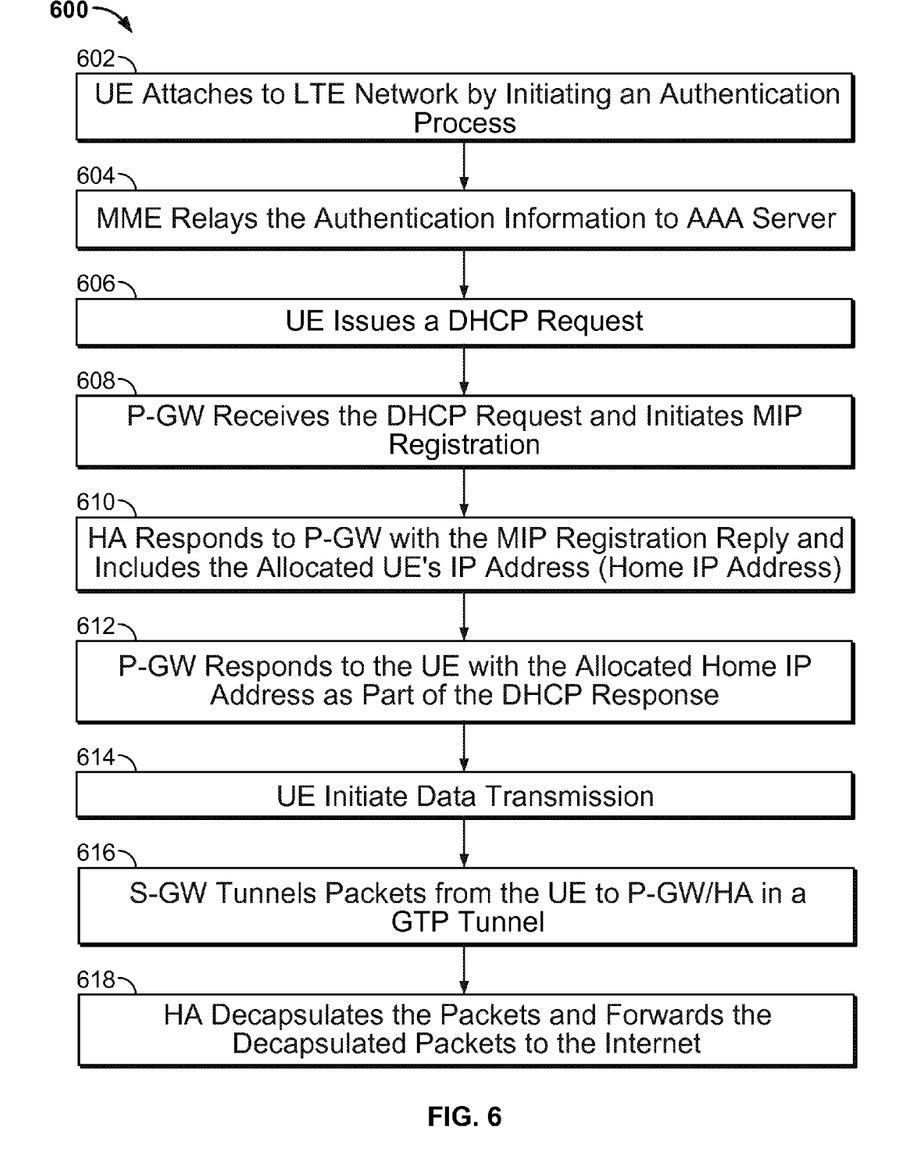
FIG. 6 is a flow chart illustrating an embodiment of a process 600 for establishing a connection between an UE and a 4G-LTE cellular network, wherein the connection can be subsequently offloaded to a Wi-Fi network.

FIG. 6 is a flow chart illustrating an embodiment of a process 600 for establishing a connection between an UE and a 4G-LTE cellular network, wherein the connection can be subsequently offloaded to a Wi-Fi network. Those of ordinary skill in the art will recognize that process 600 may be used to establish a connection between an UE and any IP-based cellular network, including WiMAX, or other networks as well.

With reference to FIG. 4 and FIG. 6, UE 101 attaches to an LTE cellular network by initiating an authentication process at 602. At 604, MME 212 relays the authentication information to AAA server 214, which authenticates UE 101 and responds with the UE's provisioned parameters. If UE 101 is configured as a mobile UE, then AAA server 214 responds with the UE's Mobile IP (MIP) attributes, including the MN-HA keys, the FA-HA Keys, and the IP address of P-GW/HA 210.

At 606, UE 101 issues a DHCP request in order to be allocated an IP address. At 608, when P-GW/HA 210 receives the DHCP request, it initiates a MIP registration. In particular, P-GW/HA 210 acts as a PMIP client and sends a MIP registration request to its HA function.

At 610, P-GW/HA 210 function responds to P-GW/HA 210 with the MIP registration reply and includes the allocated UE's IP address, hereinafter referred to as the Home IP Address. In particular, if a DHCP server is configured in P-GW/HA 210, P-GW/HA 210 requests the DHCP server to allocate an IP address for this UE 101. Otherwise, P-GW/HA 210 may allocate the IP address itself, based on local configuration.

At 612, P-GW/HA 210 responds to UE 101 with the allocated Home IP Address as part of the DHCP response. At 614, after acquiring the Home IP Address, UE 101 may initiate data transmission. At 616, S-GW 208 tunnels packets from the UE 101 to P-GW/HA 210 in a general packet radio service tunneling protocol (GTP) tunnel. At 618, upon receipt of a packet from the tunnel, P-GW/HA 210 decapsulates the packet and forwards the decapsulated packet to the Internet 120.

Figure 7:
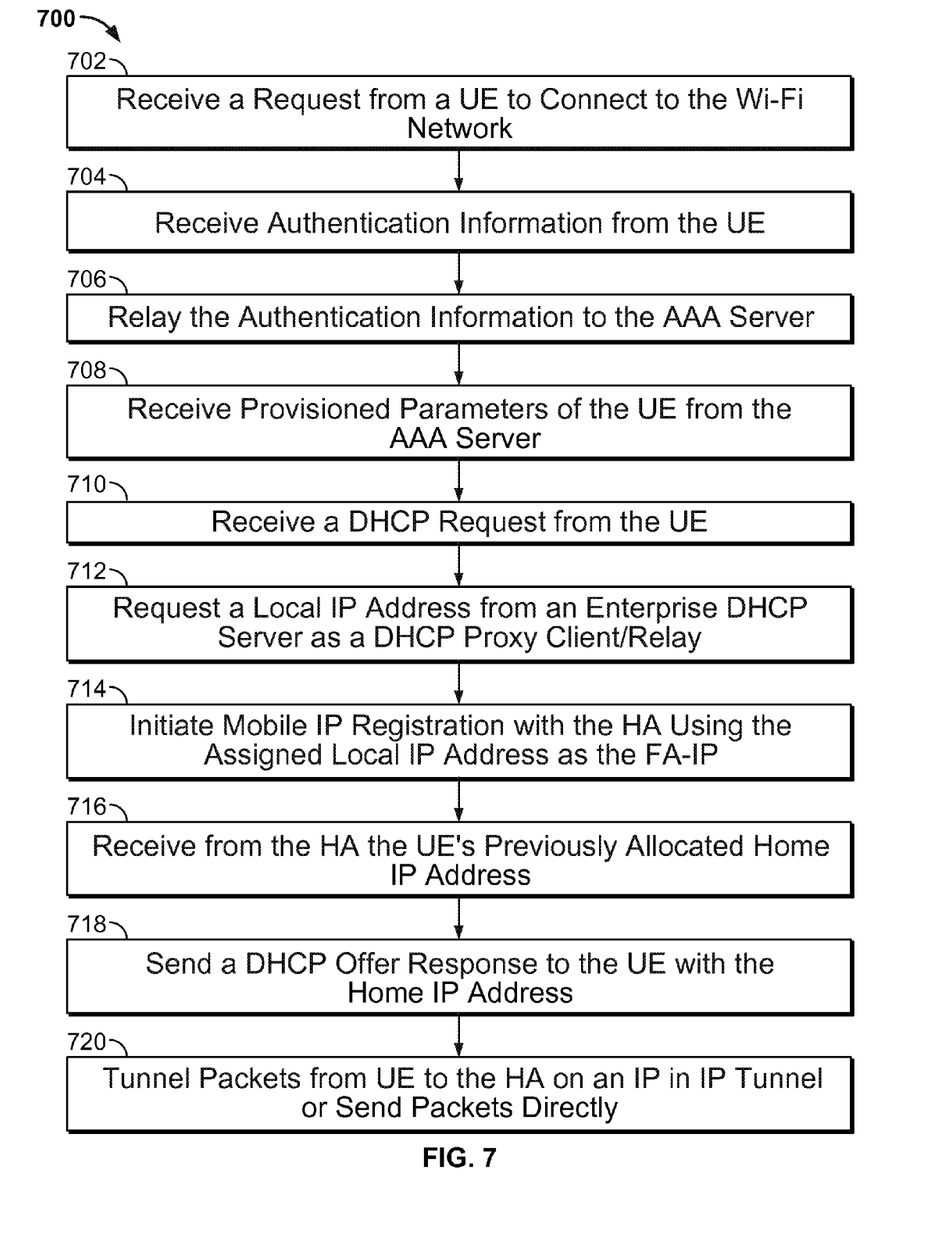
FIG. 7 is a flow chart illustrating an embodiment of a process 700 for seamlessly offloading the data of an UE from a cellular network to a Wi-Fi network.

FIG. 7 is a flow chart illustrating an embodiment of a process 700 for seamlessly offloading the data of an UE from a cellular network to a Wi-Fi network. In some embodiments, process 700 is a process that is run on AP 402 of FIG. 4. An LTE network and an enterprise Wi-Fi network are selected as illustrative examples for the cellular network and the Wi-Fi network, respectively; however, different combinations of cellular networks (e.g., WiMAX or LTE) and Wi-Fi networks (e.g., enterprise, hotspot, or residential) are possible. In an enterprise Wi-Fi network, a Wi-Fi controller may be used to control multiple access points.

With reference to FIG. 4 and FIG. 7, a request from a UE 101 to connect to enterprise Wi-Fi network 122 is received by AP 402 at 702. For example, when a UE 101 that is already configured with the AP information of the enterprise Wi-Fi network (i.e., the Service Set Identifier, or SSID) moves within range of the Wi-Fi network, UE 101 sends a request to AP 402, requesting to be attached to AP 402. In response, AP 402 initiates an authentication process. At 704, the authentication information sent by UE 101 is received by AP 402. Included in the authentication information may be the Network Access Identifier of the UE, from which AP 402 can identify the MNO that the UE is associated with.

At 706, the authentication information sent by UE 101 is relayed by AP 402 to the AAA server 214 associated with the MNO. AAA server 214 authenticates UE 101 and responds with the provisioned parameters of the UE. At 708, the provisioned parameters of UE 101 are received by AP 402, and AP 402 is associated with the UE after the completion of authentication.

At 710, a DHCP request issued by UE 101 requesting for an IP address to be allocated to the UE is intercepted by AP 402. At 712, a DHCP request for a local IP address is sent by AP 402 to a Wi-Fi network DHCP server, which may be collocated with AP 402 or connected to it. In particular, AP 402 sends the request to the Wi-Fi network DHCP server as a DHCP proxy client/relay. In response to the DHCP request sent by AP 402, the DHCP server allocates a local IP address (hereinafter referred to as the Local IP Address) from its address pool, in the same manner as it would if a local Wi-Fi client (e.g., a printer) connecting to the AP 402 had issued a DHCP request.

At 714, mobile IP registration with P-GW/HA 210 is initiated by AP 402. AP 402, acting as a proxy mobile IP (PMIP) client, initiates mobile IP registration with P-GW/HA 210 using the assigned Local IP Address as the foreign agent IP address (FA-IP). At 716, the UE's previously allocated Home IP Address is sent by P-GW/HA 210 and received by AP 402. At 718, a DHCP OFFER message which includes the Home IP Address is sent by AP 402 to the UE. UE 101 may then initiate data transmission at this point. In particular, UE 101 sends data packets with the source IP address set to Home IP Address.

At 720, AP 402 may determine whether IP in IP tunneling is needed. In the event that tunneling is needed, the UE's packets can be tunneled by AP 402 to P-GW/HA 210 on an IP in IP tunnel. The tunnel is created with the source IP address set to Local IP Address and the destination IP address set to the HA IP address. Upon receipt of a packet from the tunnel, P-GW/HA 210 decapsulates the packet and forwards the decapsulated packet to the Internet 120. In the event that tunneling is not needed, the UE's packets are sent directly to the Internet without going through a tunnel.

Handoff of a UE between a cellular network and a Wi-Fi network may occur at one or more instances during a connection with a UE. A handoff of the UE from the cellular network to a Wi-Fi network may occur when the UE initially comes within range of, and attempts to connect with, a Wi-Fi network, as described in process 700. Some UEs 101 may be pre-programmed with a given network preference (e.g., pre-programmed to always use a Wi-Fi network when available). However, it is the offload agent, acting together with the AP, which decides whether the handoff to the Wi-Fi network should occur. If the handoff criteria determine that the UE should use the cellular network for access, AP 402 may block any Wi-Fi network access by the UE 101 to force the UE to continue using the cellular network. Alternatively, UEs 101 may be enabled to set the network it connects to based on a control command, in which case the control command would be issued by AP 402. After a connection to the Wi-Fi network is established, AP 402 may subsequently force a handoff of the UE from the Wi-Fi network to the cellular network, and then from the cellular network back to Wi-Fi network, in accordance with handoff criteria previously discussed As shown in process 700, PMIP and DHCP are used to assign the same IP address (Home IP Address) to the UE, whether the UE is connected to the cellular network or to the Wi-Fi network. With the assigned IP address unchanged during the handover, existing sessions are not affected, thus avoiding interruptions to different applications that are running on the UE. Nevertheless, the UE may still be unable to access local services, e.g., services provided by printers and copiers on the Wi-Fi network. A local server is generally secured and will only respond to local requests. Since the UE continues to use the Home IP Address after it is handed over to the Wi-Fi network, the UE appears to local servers as a device from an external network; therefore, the local servers may not respond to the requests from the UE.

Figure 8:
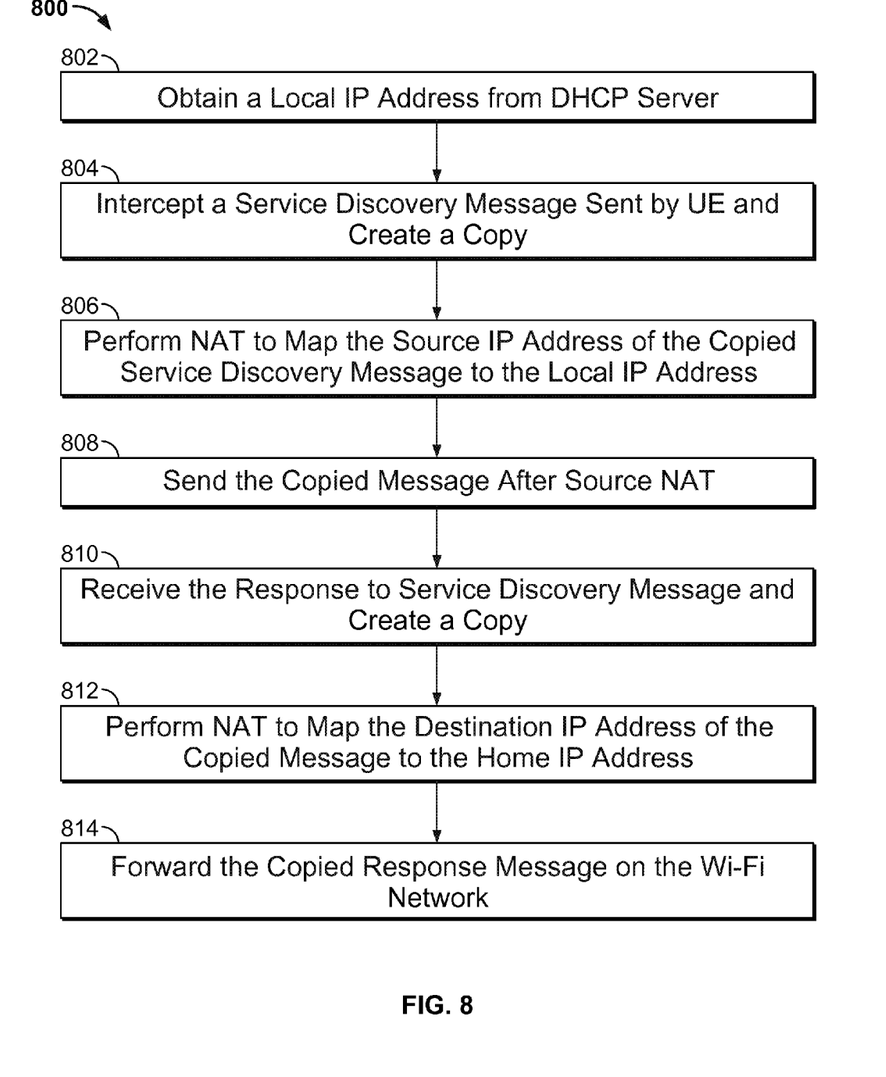
FIG. 8 is a flow chart illustrating an embodiment of a process 800 for providing the UE with access to services and devices on the Wi-Fi network in addition to services and devices in the cellular network and the Internet.

FIG. 8 is a flow chart illustrating an embodiment of a process 800 for providing the UE with access to services and devices on the Wi-Fi network in addition to services and devices in the cellular network and the Internet. The system in FIG. 4 may be further optimized to enable UE 101 to access local services even though the UE's IP address (i.e., the Home IP Address) is in an external network.

With reference to FIG. 4 and FIG. 8, at 802, a local IP address is obtained from a Wi-Fi network DHCP server by AP 402. For example, the DHCP server may be a residential, hotspot or enterprise server. When UE 101 searches for local services or devices by sending local service discovery packets on the local network (a service discovery packet is a local broadcast packet sent on local networks), AP 402 intercepts those local service discovery packets and creates copies of them at 804.

At 806, the source IP address of the copied services discovery message is mapped using network address translation (NAT) to the local address allocated by the DHCP server by AP 402. At 808, the copied services discovery message that has undergone source NAT at 806 is sent onto the local networks. A local server or device on the residential, enterprise, or hotspot network then responds to the local service discovery broadcast packets.

At 810, the response from the local server or device is received by AP 402, and a copy of the response is made by AP 402. At 812, the destination IP address of the copied response is mapped using NAT to the UE's Home IP Address. At 814, the copied response that has undergone NAT at 812 is forwarded onto the Wi-Fi network. Upon receiving the response, the UE may begin communication with the local server.

Subsequent communication between the UE and the local server or device are intercepted by AP 402 by inspection of the packet headers and/or content (e.g., by detecting that the source IP address is the UE's Home IP Address and the destination IP address is that of a local device or server). AP 402 then performs source NAT, mapping the source IP address to the local address allocated by the DHCP server. Similarly, when AP 402 intercepts a response from a local device or server, it performs destination NAT, mapping the destination IP address back to the UE's Home IP Address.

In some embodiments, the system as shown in FIG. 4 is further optimized to permit control of the flow of traffic through the cellular core network versus the Wi-Fi network backhaul. The control of flow of traffic through the cellular core network versus the Wi-Fi network backhaul may be based on different criteria. The criteria may be based on any combination of network policies, characteristics and QoS requirements of the UE (such as whether the UE is a subscriber with premium service or standard services), the type of application (e.g., video versus http traffic), network performance, load balancing metrics, and the like. Network policies may include the policy of the mobile network operator (MNO), the policy of the Wi-Fi network backhaul provider (e.g., the DSL service provider or the cable network service provider), and/or the policy of the local network. Performance and load-balancing metrics may include the level of traffic congestion, the degree of latency, the throughput or other metrics. The metrics may be monitored on the cellular network and the Wi-Fi network.

In some embodiments, based on the combination of network policies, metrics, and UE and application characteristics, AP 402 creates a set of criteria which are applied to the traffic from the UE on a packet by packet basis. The criteria are implemented as a set of packet inspection rules for directing traffic to the cellular network core or to the Wi-Fi network backhaul. A rule may be based on the port number (for example, the TCP or UDP port number), deep packet inspection (inspecting the contents of the packets to determine the packet application and state), or other packet information. Packets from a UE destined for the cellular network are encapsulated by AP 402 and tunneled to P-GW/HA 210 in the cellular core. For packets destined for the Wi-Fi backhaul network, AP 402 performs NAT to map the source IP address to Local IP Address.

In some embodiments, during the authorization process, AP 402 retrieves the QoS and data control policies from the MNO's AAA server and applies these policies for each UE. The policies may be applied by AP 402 at the granularity of individual application sessions of the UE. AP 402 may apply the QoS and data control policies to decide whether UE data should be forwarded to the cellular network or offloaded through the Wi-Fi network, with the objective of ensuring that quality of service targets are met when the UE is offloaded to a Wi-Fi network.

In some embodiments, AP 402 may obtain the QoS and data control policies from the Wi-Fi backhaul provider network and enforces those policies for each UE and/or for the individual applications of a UE. Doing so allows the Wi-Fi backhaul provider network to exercise control over the QoS of the UEs when connected to the Wi-Fi network. AP 402 may also enforce controls by the Wi-Fi backhaul provider network to permit or deny certain application data and to affect forwarding decisions for certain traffic.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of offloading data from a cellular network to a Wi-Fi network, comprising:
    receiving a request from a user equipment (UE) to connect to a Wi-Fi network;
    determining that the UE is a subscriber to a cellular network;
    determining whether to offload data from the cellular network to the Wi-Fi network based at least in part on a set of offload criteria;
    obtaining a Home IP Address, wherein the Home IP Address comprises a mobile IP address corresponding to the UE assigned by the cellular network;
    allocating the Home IP Address to the UE as the UE's IP address for communicating with the UE on the Wi-Fi network; and
    offloading data from the cellular network to the Wi-Fi network.

2. The method of claim 1, further comprising:
    receiving authentication information from the UE, wherein the determining that the UE is a subscriber to the cellular network is based on the authentication information.

3. The method of claim 1, further comprising:
    sending the authentication information to an authentication, authorization, and accounting (AAA) server associated with the cellular network; and
    receiving a plurality of mobile IP attributes associated with the UE from the AAA server, wherein the plurality of mobile IP attributes include a home agent (HA) IP address.

4. The method of claim 1, further comprising:
    intercepting a dynamic host configuration protocol (DHCP) request sent by the UE;
    sending a DHCP request to a local DHCP server as a DHCP proxy client; and
    receiving a local IP address allocated by the local DHCP server.

5. The method of claim 4, further comprising:
    initiating mobile IP registration with a home agent (HA) associated with the cellular network.

6. The method of claim 5, wherein the initiating of the mobile IP registration is performed by a proxy mobile IP (PMIP) client, and wherein a foreign agent IP address (FA-IP) comprises the local IP address allocated by the local DHCP server.

7. The method of claim 4, further comprising creating a tunnel with a source IP address set to the local IP address and a destination IP address set to a home agent IP address corresponding to a home agent associated with the cellular network, wherein data packets received from the UE are tunneled to the home agent through the tunnel.

8. The method of claim 4, further comprising:
    determining whether to create an IP in IP tunnel to the home agent; and
    in the event that the IP in IP tunnel is not created, sending data packets received from the UE directly to the Internet.

9. The method of claim 1, wherein the Home IP Address is obtained from a home agent associated with the cellular network.

10. The method of claim 1, wherein allocating the Home IP Address to the UE as the UE's IP address for communicating with the UE on the Wi-Fi network comprises sending the Home IP Address to the UE in a DHCP offer message.

11. The method of claim 1, wherein the set of offload criteria is based at least in part on one or more of the following: a network policy, a quality of service (QoS) requirement, a type of application, network performance, and load-balancing metrics.

12. The method of claim 11, wherein the network performance includes one or more of the following: a level of traffic congestion, a degree of latency, and a throughput.

13. The method of claim 1, wherein a communication session associated with an application running on the UE prior to the offloading of the data is preserved after the offloading of the data has started.

14. The method of claim 13, wherein the application is one of the following: streaming video, VoIP call, and VPN access.

15. The method of claim 1, wherein determining whether to offload data from the cellular network to the Wi-Fi network comprises denying access to the Wi-Fi network by the UE in the event that the determination of whether to offload data is negative.

16. The method of claim 1, further comprising providing the UE with access to a local service.

17. The method of claim 16, wherein providing the UE with access to a local service comprises:
    intercepting a local service discovery packet sent by the UE;
    creating a copy of the local service discovery packet;
    mapping a source IP address of the copy of the local service discovery packet using network address translation (NAT) to a local address allocated by a DHCP server; and
    sending the mapped copy of the local service discovery packet onto a local network.

18. The method of claim 17, wherein providing the UE with access to a local service further comprises:
intercepting a response to the local service discovery packet;
creating a copy of the response;
mapping a destination IP address of the copy of the response using NAT to the Home IP Address; and
sending the mapped copy of the response onto the Wi-Fi network.

19. The method of claim 1, further comprising sending the offloaded data to a cellular core network via a mobile IP tunnel based at least in part on a second set of criteria, wherein the second set of criteria includes a type of application associated with the offloaded data.

20. The method of claim 1, further comprising sending the offloaded data to a Wi-Fi network backhaul based at least in part on a second set of criteria, wherein the second set of criteria includes a type of application associated with the offloaded data.

21. A system for offloading data from a cellular network to a Wi-Fi network, comprising:
a processor; and
a memory coupled with the processor, wherein the memory is configured to provide the processor with instructions stored therein which when executed cause the processor to:
receive a request from a user equipment (UE) to connect to a Wi-Fi network;
determine that the UE is a subscriber to a cellular network;
determine whether to offload data from the cellular network to the Wi-Fi network based at least in part on a set of offload criteria;
obtain a Home IP Address, wherein the Home IP Address comprises a mobile IP address corresponding to the UE assigned by the cellular network;
allocate the Home IP Address to the UE as the UE's IP address for communicating with the UE on the Wi-Fi network; and
offload data from the cellular network to the Wi-Fi network.

22. The system of claim 21, wherein the memory is further configured to provide the processor with instructions which when executed cause the processor to:
receive authentication information from the UE, wherein the determining that the UE is a subscriber to the cellular network is based on the authentication information.

23. The system of claim 21, wherein the memory is further configured to provide the processor with instructions which when executed cause the processor to:
send the authentication information to an authentication, authorization, and accounting (AAA) server associated with the cellular network; and
receive a plurality of mobile IP attributes associated with the UE from the AAA server, wherein the plurality of mobile IP attributes include a home agent (HA) IP address.

24. The system of claim 21, wherein the memory is further configured to provide the is processor with instructions which when executed cause the processor to:
intercept a dynamic host configuration protocol (DHCP) request sent by the UE;
send a DHCP request to a local DHCP server as a DHCP proxy client; and
receive a local IP address allocated by the local DHCP server.

25. The system of claim 24, wherein the memory is further configured to provide the processor with instructions which when executed cause the processor to:
initiate mobile IP registration with a home agent (HA) associated with the cellular network.

26. The system of claim 25, wherein the initiating of the mobile IP registration is performed by a proxy mobile IP (PMIP) client, and wherein a foreign agent IP address (FA-IP) comprises the local IP address allocated by the local DHCP server.

27. The system of claim 24, wherein the memory is further configured to provide the processor with instructions which when executed cause the processor to create a tunnel with a source IP address set to the local IP address and a destination IP address set to a home agent IP address corresponding to a home agent associated with the cellular network, wherein data packets received from the UE are tunneled to the home agent through the tunnel.

28. The system of claim 24, wherein the memory is further configured to provide the processor with instructions which when executed cause the processor to:
determine whether to create an IP in IP tunnel to the home agent; and
in the event that the IP in IP tunnel is not created, send data packets received from the UE directly to the Internet.

29. The system of claim 21, wherein the Home IP Address is obtained from a home agent associated with the cellular network.

30. The system of claim 21, wherein allocating the Home IP Address to the UE as the UE's IP address for communicating with the UE on the Wi-Fi network comprises sending the Home IP Address to the UE in a DHCP offer message.

31. The system of claim 21, wherein the set of offload criteria is based at least in part on one or more of the following: a network policy, a quality of service (QoS) requirement, a type of application, network performance, and load-balancing metrics.

32. The system of claim 31, wherein the network performance includes one or more of the following: a level of traffic congestion, a degree of latency, and a throughput.

33. The system of claim 21, wherein a communication session associated with an application running on the UE prior to the offloading of the data is preserved after the offloading of the data has started.

34. The system of claim 33, wherein the application is one of the following: streaming video, VoIP call, and VPN access.

35. The system of claim 21, wherein determining whether to offload data from the cellular network to the Wi-Fi network comprises denying access to the Wi-Fi network by the UE in the event that the determination of whether to offload data is negative.

36. The system of claim 21, wherein the memory is further configured to provide the processor with instructions which when executed cause the processor to provide the UE with access to a local service.

37. The system of claim 36, wherein providing the UE with access to a local service comprises:
intercepting a local service discovery packet sent by the UE;
creating a copy of the local service discovery packet;
mapping a source IP address of the copy of the local service discovery packet using network address translation (NAT) to a local address allocated by a DHCP server; and
sending the mapped copy of the local service discovery packet onto a local network.

38. The system of claim 37, wherein providing the UE with access to a local service further comprises:

intercepting a response to the local service discovery packet;

creating a copy of the response;

mapping a destination IP address of the copy of the response using NAT to the Home IP Address; and     sending the mapped copy of the response onto the Wi-Fi network.

39. The system of claim 21, wherein the memory is further configured to provide the processor with instructions which when executed cause the processor to send the offloaded data to a cellular core network via a mobile IP tunnel based at least in part on a second set of criteria, wherein the second set of criteria includes a type of application associated with the offloaded data.

40. The system of claim 21, wherein the memory is further configured to provide the processor with instructions which when executed cause the processor to send the offloaded data to a Wi-Fi network backhaul based at least in part on a second set of criteria, wherein the second set of criteria includes a type of application associated with the offloaded data.

41. A computer program product for offloading data from a cellular network to a Wi-Fi network, the computer program product being embodied in a tangible computer readable storage medium and comprising computer instructions for:

receiving a request from a user equipment (UE) to connect to a Wi-Fi network;

determining that the UE is a subscriber to a cellular network;

determining whether to offload data from the cellular network to the Wi-Fi network based at least in part on a set of offload criteria;

obtaining a Home IP Address, wherein the Home IP Address comprises a mobile IP address corresponding to the UE assigned by the cellular network;

allocating the Home IP Address to the UE as the UE's IP address for communicating with the UE on the Wi-Fi network; and     offloading data from the cellular network to the Wi-Fi network.

\* \* \* \* \*